United States Patent [19]

Scribner

[11] Patent Number: 4,982,756
[45] Date of Patent: * Jan. 8, 1991

[54] USE OF ULTRASONIC ENERGY TO DECREASE THE GEL STRENGTH OF WAXY CRUDE OIL

[75] Inventor: Michael E. Scribner, Ponca City, Okla.

[73] Assignee: Conoco Inc., Ponca City, Okla.

[*] Notice: The portion of the term of this patent subsequent to Aug. 7, 2007 has been disclaimed.

[21] Appl. No.: 418,012

[22] Filed: Oct. 6, 1989

[51] Int. Cl.$^5$ .............................................. F17D 1/16
[52] U.S. Cl. .......................................... 137/4; 137/13; 137/92
[58] Field of Search ............... 137/13, 4, 92; 366/108, 366/116

[56] References Cited

U.S. PATENT DOCUMENTS

| | | | |
|---|---|---|---|
| 3,393,144 | 7/1968 | Button | 208/28 |
| 3,584,053 | 6/1971 | Seavey et al. | |
| 3,910,299 | 10/1975 | Tackett | 137/13 X |
| 4,488,816 | 12/1984 | Vota | |
| 4,697,426 | 10/1987 | Knowles | 137/13 X |

FOREIGN PATENT DOCUMENTS 197709  9/1977  U.S.S.R.
803566  6/1982  U.S.S.R.

Primary Examiner—Alan Cohan

[57] ABSTRACT

Ultrasonic energy is applied to a combination of waxy crude oil and a solution of polymeric wax crystal modifier to effect dissolution of the modifier in the crude oil, thereby reducing the gel strength of the crude oil. The ultrasonic energy may be applied to the waxy crude oil to lower the gel strength of the wax crystals prior to addition of the solution of wax crystal modifier.

11 Claims, 2 Drawing Sheets

USE OF ULTRASONIC ENERGY TO DECREASE THE GEL STRENGTH OF WAXY CRUDE OIL

BACKGROUND OF THE INVENTION

Some of the crude oils that oil companies have the occasion to pipeline contain "high" amounts (10 percent or more) of paraffin or wax. The wax will crystallize and accumulate as the temperature of the crude oil mass is lowered, thus increasing the viscosity of the crude oil and making it more difficult to pump at a given rate. In addition, if the flow of crude oil is stopped for a period of time greater than approximately 12 hours, the wax crystals will form an interconnected network which will impede flow when it comes time to restart the pipeline.

The force required to break the gel and begin flow is known as the gel strength. In some cases, the gel strength may be sufficiently high as to keep the flow from restarting. In the case of a subsea pipeline, the consequences could be disastrous. Presently, offshore platforms and terminal are designed to inject compounds known as pour-point depressants or wax crystal modifiers. These compounds serve to inhibit the interconnection of the wax crystals keeping the gel strength below the force needed to initiate flow of the pipeline. In many instances the cost of the treatment package is a major fraction of the cost of production.

The wax crystal modifiers used in waxy crude oils are solid materials which are marginally soluble in hydrocarbon fractions, particularly crude oils. They are more soluble in lighter hydrocarbon fractions, but even then may constitute only a small percentage of the modifier-solvent mix. Customarily the wax modifiers are dissolved in a light hydrocarbon fraction and are then stored for use as needed. In the case of an offshore platform, the extra volume and weight of solvent-chemical mixture requires expensive storage space which must be designed into the platform. Also, the substantial amount of solvent hydrocarbon fraction required increases processing cost in the refinery where this material is recovered from the crude oil. It would be advantageous to provide a process which would reduce the amount of wax modifier required and accordingly the cost and storage space required on the platform, as well as the refinery processing cost involved.

Ultrasonic processors are used to provide vibrational energy at very high frequencies (20,000–800,000 cycles per second). In a liquid medium, these oscillations create high shear strains which create microscopic gas pockets. These gas pockets, by collapsing and expanding, serve to enhance the shear strain to the point that weak molecular binding forces can be disrupted. For instance, biological tissues can be completely disrupted and homogenized by the application of ultrasonic energy. Ultrasonic energy has also found use in the depolymerization and viscosity control of synthetic and natural polymers. High-frequency vibration also has been utilized to enhance chemical reactions.

PRIOR ART

Seavey et al. U.S. Pat. No. 2,584,053 relates to the use of a sonic device for treating liquid materials including slurries and mixtures by the application of alternating shear forces of desired amplitude an frequency level. The use of sonic frequencies aids in the formation of dispersions of solids in liquids and breaking the fibers down into component fibrillies.

Vota U.S. Pat. No. 4,488,816 discloses the use of ultrasonic energy to control the viscosity and other properties of materials such as industrial paints, blends of additives and lubricating oils, industrial water treatments and the manifold blending of fluids in petroleum petrochemical fields and the food industry.

Russian Patent No. 571657 discloses a method for treating petroleum containing a high amount (greater than 20 percent) of paraffin by vibroheating. The treatment or conditioning is conducted at 20–250 Hertz such that the paraffin structure breaks and the viscosity is reduced, thereby enhancing the pumping rate of said petroleum stream for transportation.

Russian Patent No. 803566 relates to a hydrodynamic vibratory device which is used for accelerating the passage of liquid and viscous materials through pipelines wherein the liquid is subjected to high frequency pulsation from the vibrator resulting in the reduction of fluid friction on the pipe walls and hence improved flowability.

THE INVENTION

According to the present invention a solution of a polymeric wax crystal modifier is combined with flowing waxy crude oil and the combined material is subjected to ultrasonic energy, whereby a sufficient amount of modifier is dissolved in the crude oil to lower the viscosity and the gel strength thereof. In one aspect of the invention, the ultrasonic energy is applied to the flowing waxy crude oil prior to the addition of the solution of polymeric wax crystal modifier.

DETAILED DESCRIPTION OF THE INVENTION

Figure 1:
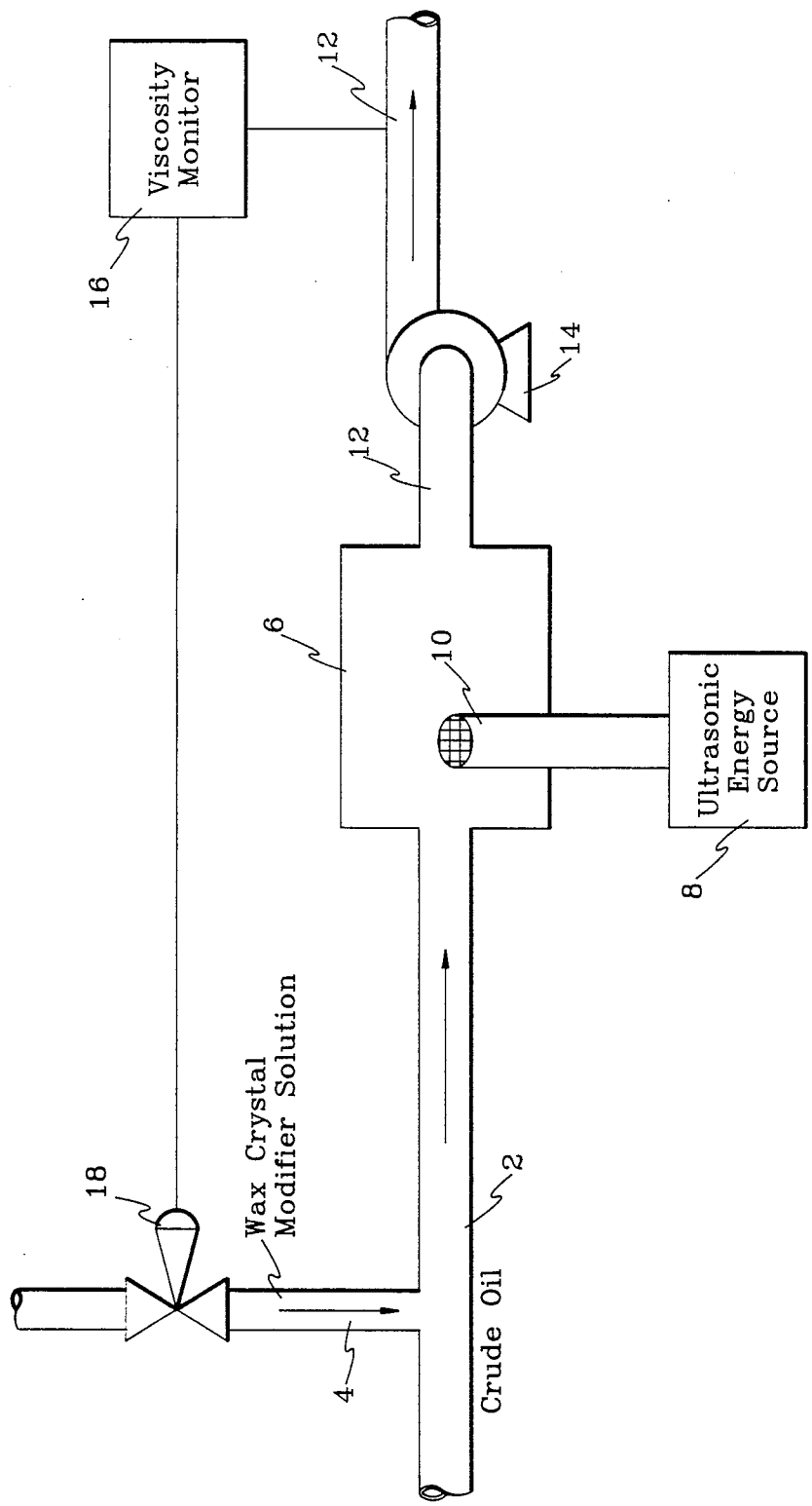
FIGS. 1 and 2 are schematic representations of process and apparatus arrangements for carrying out the invention.

The invention is best described by reference to the drawings. Referring to FIG. 1, flowing waxy crude oil is passed through line 2 into vessel 6. This may be any crude oil which is difficult to pump at ambient conditions because of its high viscosity. Such crude oils usually contain from about 5 to about 30 percent wax. Even waxy crude oils which are capable of being pumped as long as they are flowing may, if their movement is halted temporarily or over an extended period of time, become sufficiently viscous that restarting flow is extremely difficult or even impossible. Waxy crude oils are usually easy to pump if they are increased sufficiently in temperature. This invention is particularly applicable to situations where it is not feasible or economically desirable to provide enough heat to the waxy crude oil to make it readily pumpable. Also, even if heat is provided to waxy crude oil, if pumping is stopped for a substantial period of time for any reason and the crude oil is exposed to low temperatures, blockage of the flow of the crude oil may be encountered. This invention is especially applicable to the transfer of crude oil from an offshore platform by underwater pipeline to shore. The governing viscosity in the movement of crude oil in this manner is the viscosity which is obtained in the pipeline below the surface of the water if flow of crude oil is halted for any appreciable period of time. The invention is also applicable to the transfer of waxy crude oil between ships and also from ship to shore or from shore to a ship. While the above types of transfer are typical, the invention is applicable to any movement of waxy crude oil where a temporary or substantial cessation of flow would result in blockage of the crude oil line.

Returning now to FIG. 1, a solution of polymeric wax crystal modifier is passed through control valve 18 and line 4 and is combined with the waxy crude oil before it enters vessel 6. While a conventional control valve is shown, any suitable means for controlling the flow of the solution of wax crystal modifier may be employed.

Ultrasonic energy is provided to the waxy crude oil and the solution of polymeric wax crystal modifier from ultrasonic energy source 8 through probe 10. Through the action of the ultrasonic energy, the wax crystal network of the waxy crude oil is modified to reduce the gel strength of the crude oil. Additionally the ultrasonic energy enables the solution of the polymeric wax crystal modifier to more readily be dissolved in the waxy crude oil stream and further lower the gel strength thereof.

The waxy crude oil containing dissolved waxy crystal modifier is withdrawn from vessel 6 through lines 12 and passed through pump 14 for transfer to its destination. The amount of the solution of polymeric wax crystal modifier introduced to vessel 6 and dissolved in the waxy crude oil slip stream can be regulated to provide a constant viscosity of the crude oil-wax crystal modifier mixture leaving vessel 6 through line 12. This regulation is effected by monitoring the viscosity of this mixture and controlling the flow through control valve 18 in response to changes in such viscosity. Sufficient wax crystal modifier is introduced to the flowing waxy crude oil in line 2 to assure that the crude oil stream will remain pumpable even if flow is interrupted at a future time.

The polymeric wax crystal modifiers used in the process of the invention are solids at room temperature and usually are materials of high molecular weight in the hundreds of thousands or higher. Typically, these materials may be polymers, copolymers or terpolymers; however, copolymers and terpolymers are usually preferred. Examples of solid polymeric wax crystal modifiers are terpolymers of low molecular weight olefins, such as ethylene or propylene with an alkyvinylacetate and maleic anhydride. The alky group in the vinyl acetate may vary from 1 to about 20 carbon atoms. Other polymers which may be used are copolymers of low molecular weight olefins and alkylvinyl acetates of similar alkyl length. Still other polymers are copolymers of $C_2$ to about $C_{20}$ alkenes and maleic anhydride.

Specific examples of polymers include terpolymers of ethylene, vinyl acetate and maleic acid; propylene, ethylvinyl acetate and maleic acid, copolymers of ethylene and vinyl acetate, octene and methyl vinyl acetate, 1-heptadecen an maleic acid, and the like. Of the olefins used in the various polymers, copolymers and terpolymers, ethylene is usually preferred because of its low cost and availability.

Some of the solid polymers are readily dissolved in solvents, usually by the application of mixing. Other solids are dissolved only in heated solvents, again usually accompanied by mixing. Various hydrocarbon fractions may be used as solvents, including such fractions as kerosene and diesel oil. Individual hydrocarbons may also be used as solvents including such compounds as toluene, xylene and $C_6$–$C_{12}$ paraffins, such as octane, decane and dodecane. Again depending on the particular solid polymer which is being used heating of the solvent plus mixing may be required to dissolve the polymer. The amount of solvent required for dissolution of the solid polymer will vary from about 2 to about 10 parts of solvent per part of polymer and more usually from about 2 to about 5 parts per part.

While viscosity is conveniently used to monitor and control the addition of the solution of polymeric wax crystal modifier to the flowing crude oil, the gel strength of the resulting product, which is a function of viscosity, is the preferred property used to characterize the flowability of the crude oil and the mixture of crude oil and wax crystal modifier.

The gel strength of a mixture of crude oil and polymeric wax crystal modifier which has been subjected to ultrasonic energy is measured in a gelometer (pipe viscometer). This apparatus consists of a 10 inches × 1.065 inch jacketed pipe which allows for a circulating flow of water to regulate the temperature of the crude-wax crystal modifier mixture in the pipe. A pressure applying system is attached to the pipe via a ⅛ inch teflon tubing connected to an oil/water reservoir. The pressure is applied by a constant volume motorized pump.

In carrying out the gel strength measurement, the pipe is filled with the mixture of crude oil and wax crystal modifier. A cooling program is then initiated to provide a cooling rate 8.3° C. per hour until the temperature of the mixture in the pipe reaches 0° C. Since the mixture of crude oil and wax modifier reduces in volume during the cooling step, a stand pipe is provided on the gelometer and the initial mixture of crude and wax crystal modifier is introduced in an amount to fill at lest part of the stand pipe. The temperature of the mixture is held at 0° C. for 24 hours before running the gel breaking test. At this time a drain plug in the stand pipe is removed so that the excess crude-wax crystal modifier may drain from the system. The pressure applying pump is then activated to apply pressure to the mixture in the gelometer and the pressure at which the mixture begins to move from the gelometer is determined. The gel strength is then calculated from the following formula:

$$\text{Gel Strength} = \frac{(psi) \times (Pipe\ Diameter) \times (300)}{Pipe\ Length}$$

The amount of polymeric wax crystal modifier required to effectively treat a flowing stream of waxy crude oil may be readily determined by experiment. Once the desired viscosity of the crude oil (which is a measure of the gel strength of the crude oil) has been determined, the amount of the solution of polymeric wax crystal modifier required to attain this viscosity may readily be combined with the waxy crude oil stream. Usually the amount of polymeric wax crystal modifier in the solution introduced to the flowing waxy crude oil is sufficient to provide a concentration of such modifier of between about 100 and about 2000 parts per million, although more modifier may be added if desired. More preferably, the amount of polymeric wax crystal modifier in the solution will vary from about 400 to about 600 parts per million.

As shown in FIG. 1, it is desirable to inject the solution of polymeric wax crystal modifier into the flowing waxy crude oil upstream of the pump being used to transfer such crude oil. In this way, the wax crystal modifier and flowing waxy crude oil are thoroughly mixed under conditions of turbulent flow in their passage through the transfer pump.

Any commercially available ultrasonic energy source may be used in carrying out the invention. Such energy sources produce high frequency oscillating currents which are transmuted to supersonic waves of compression and rarification in a transmitting liquid by use of a piezo-electric quartz crystal. The theory and operation of ultrasonic energy sources has been widely described in the literature and in numerous patents. The frequency of the alternating current used in the process of the invention will ordinarily vary between about 15,000 cycles per second and about 900,000 cycles per second although higher frequencies may be used if desired. The total wattage required to impart the desired ultrasonic energy will usually be between about 0.5 and about 10 kilowatts.

Figure 2:
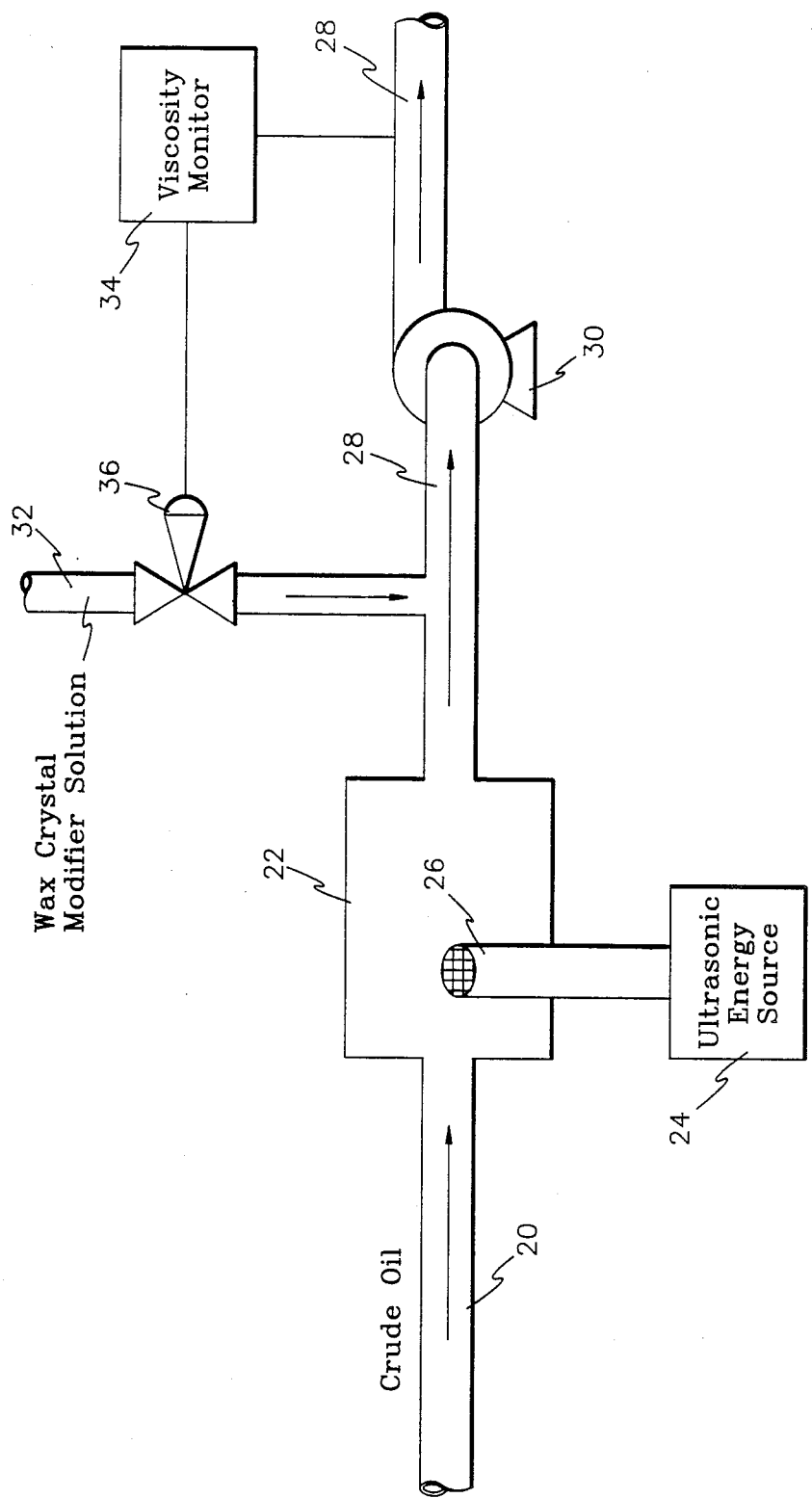

In another aspect of the invention, set forth in FIG. 2, a waxy crude oil stream is introduced through line 20 to vessel 22. The ultrasonic energy required in this aspect of the invention is provided by energy source 24 through probe 26. The waxy crude oil stream which has been subjected to ultrasonic energy is withdrawn from vessel 22 through line 28 and is combined with wax crystal modifier solution from line 32. The waxy crude oil containing dissolved wax crystal modifier is passed through pump 30 under conditions of turbulent flow to provide thorough mixing, and is transferred to its destination through line 28. The viscosity of the waxy crude oil containing dissolved wax crystal modifier is monitored by viscosity monitor 34 which controls the viscosity of this stream by regulating the flow through control valve 36 of wax crystal modifier solution. Here again, the viscosity and the gel strength point desired in the flowing waxy crude oil in line 28 will establish the amount of polymeric wax crystal modifier solution used in the process.

The following examples are presented in illustration of the invention:

EXAMPLE 1

A test is carried out in apparatus as shown in FIG. 1 of the drawings. The amount of crude oil used in the test is 30,000 bbls/day or 1250 bbls/hr. The crude oil which contains 12 percent wax and a light hydrocarbon (20 to 1) solution of GELSTOP 78 ® wax crystal modifier, a terpolymer of ethylene, vinylacetate and carbon monoxide manufactured by Conoco Inc. are introduced to vessel 6. Sufficient GELSTOP is provided so that 200 ppm of this material (based on the total crude oil) is available for combination with the crude oil. An ultrasonic sound source, VIBRA CELL ™ manufactured by Sonics and Materials, Inc. which provides ultrasonic sound at a frequency of 20,000 cycles per second with a power input of 2 KW is provided to vessel 6. The energy provided by this source is sufficient to modify the waxy crystal network of the crude oil to reduce its gel strength and also facilitate the dissolution of the 200 ppm of GELSTOP in the crude oil stream.

The crude oil effluent containing GELSTOP is removed from vessel 6 and measurement of this stream shows a gel strength of 45 lb force/100 ft$^2$.

EXAMPLE 2

Another run is carried out under the same conditions as in Example 1, but without the use of ultrasonic sound, and provides a crude oil product having gel strength of 75 lb force/100 ft$^2$.

EXAMPLE 3

Another test run is carried out to determine the amount of GELSTOP required to provide a crude oil having a gel strength of 45 lb force/100 ft$^2$, without the use of ultrasonic sound. With the same crude oil 350 ppm of GELSTOP must be added to obtain the desired level of gel strength.

It is apparent that the process of the invention provides a crude oil-crystal modifier mixture of substantially lower gel strength, thus allowing the use of less wax crystal modifier solution to obtain the desired results.

While certain embodiments and details have been shown for the purpose of illustrating the present invention, it will be apparent to those skilled in this art that various changes and modifications may be made herein without departing from the spirit or scope of the invention.

I claim:

1. In a process for flowing waxy crude oil through a pipe line, the improvement which comprises applying ultrasonic energy to the flowing crude oil prior to or after combining with said crude oil a solution of polymeric wax crystal modifier whereby the gel strength of the crude oil-wax crystal modifier is lowered.

2. In a process for flowing waxy crude oil through a pipeline, the improvement which comprises:
    (a) combining the flowing crude oil with a solution of polymeric wax crystal modifier;
    (b) applying ultrasonic energy to the combined crude oil and modifier whereby said modifier is dissolved in said crude oil to lower the gel strength thereof.

3. The process of claim 2 in which the viscosity of the combined crude oil and modifier after application of sonic energy thereto is monitored and the amount of modifier combined with the crude oil is controlled in response to said monitored viscosity, thereby controlling the concentration of modifier in the crude oil.

4. The process of claim 2 being carried out on an offshore platform.

5. The process of claim 2 being carried out in a ship to ship transfer of crude oil.

6. The process of claim 2 being carried out in a transfer of crude oil between ship and shore.

7. In a process for flowing waxy crude oil through a pipeline, the improvement which comprises:
    (a) applying ultrasonic energy to the flowing crude oil to reduce the gel strength thereof;
    (b) combining the flowing crude oil a solution of polymeric wax crystal modifier whereby a sufficient amount of said modifier is dissolved in said crude oil to further lower the gel strength thereof.

8. The process of clam 7 in which the viscosity of the modifier and crude oil after application of sonic energy thereto is monitored and the amount of modifier combined with the crude oil is controlled in response to said monitored viscosity, thereby controlling the concentration of modifier in the crude oil.

9. The process of claim 7 being carried out on an offshore platform.

10. The process of claim 7 being carried out in a ship to ship transfer of crude oil.

11. The process of claim 7 being carried out in a transfer of crude oil between ship and shore.

* * * * *